Feb. 19, 1929.  
C. A. STEVENS ET AL  
1,702,323  
COMBINED HARVESTER, THRASHER, AND SEPARATOR  
Filed Dec. 3, 1924   5 Sheets-Sheet 5
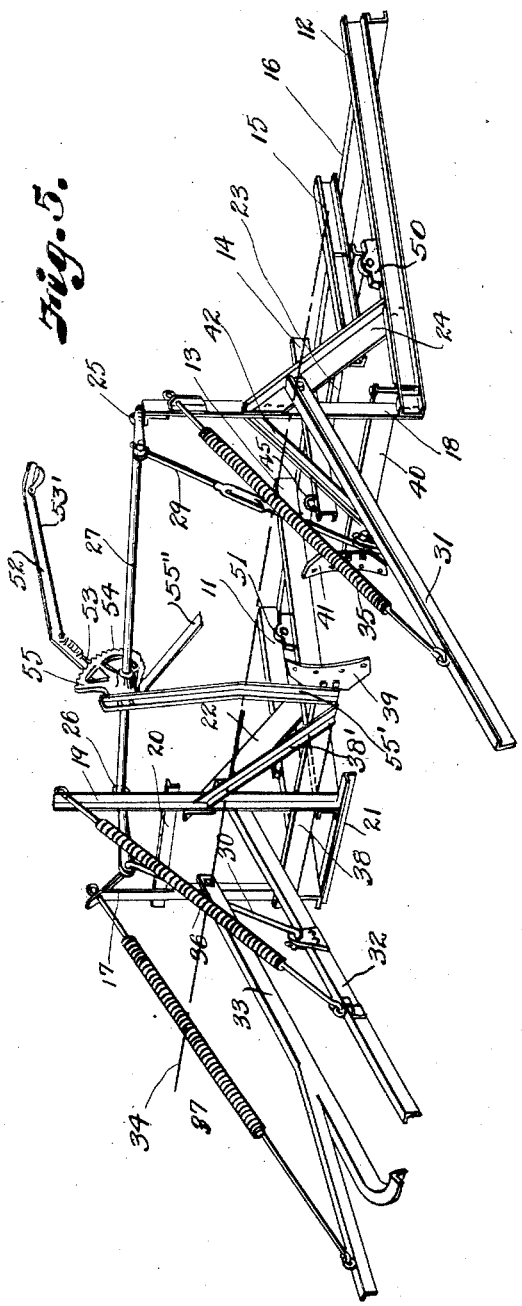
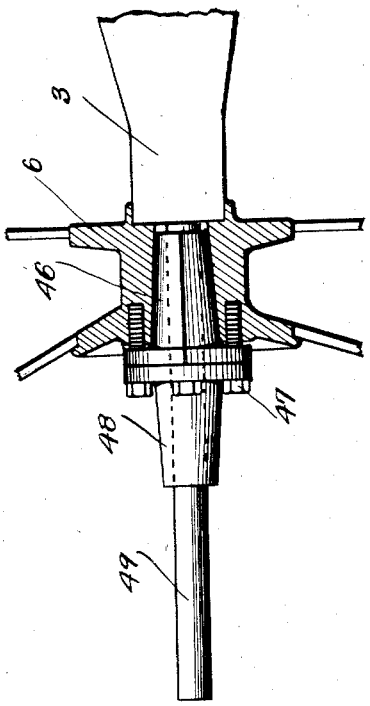
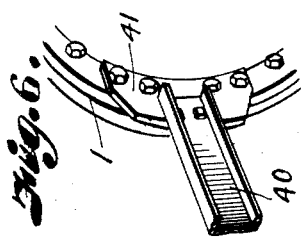
INVENTORS  
Clarence A. Stevens, George D. Baldwin, & John Irl Michaels.  
BY  
ATTORNEY Patented Feb. 19, 1929.

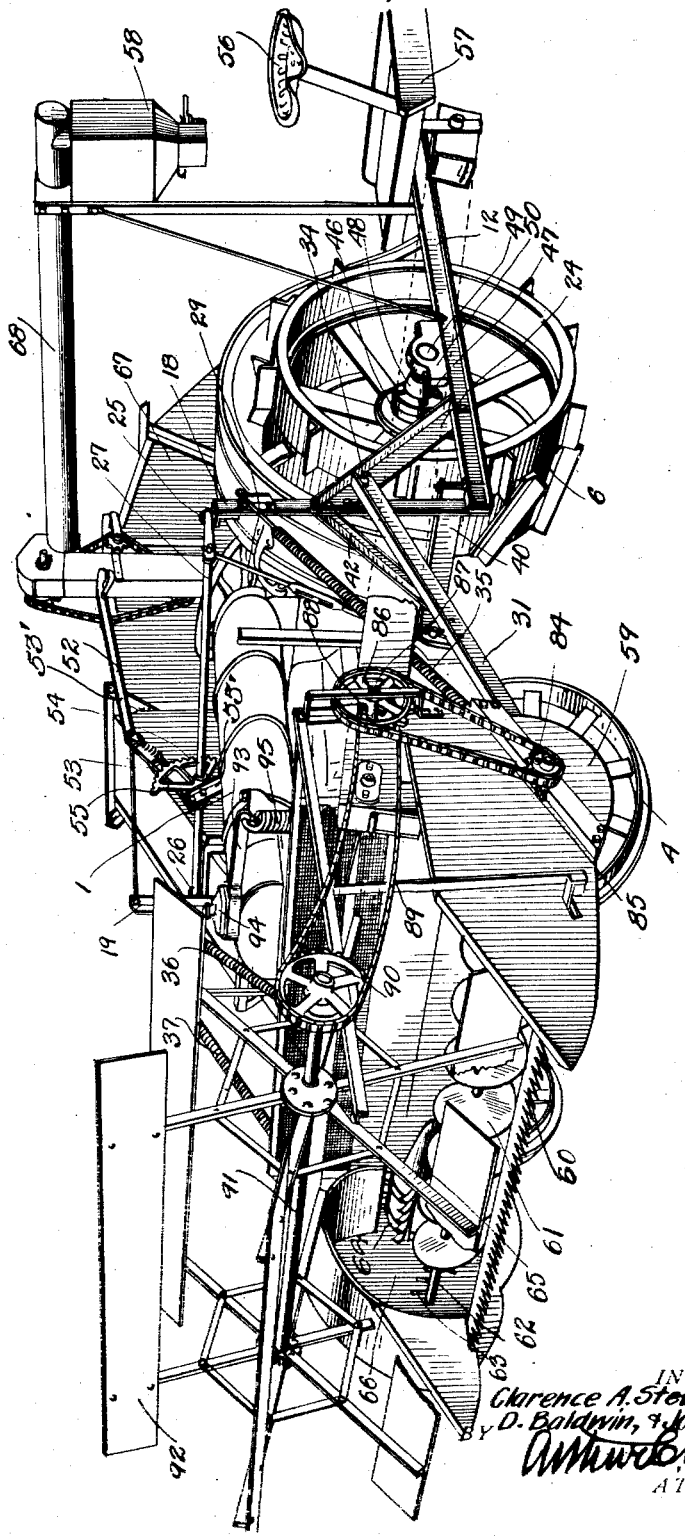

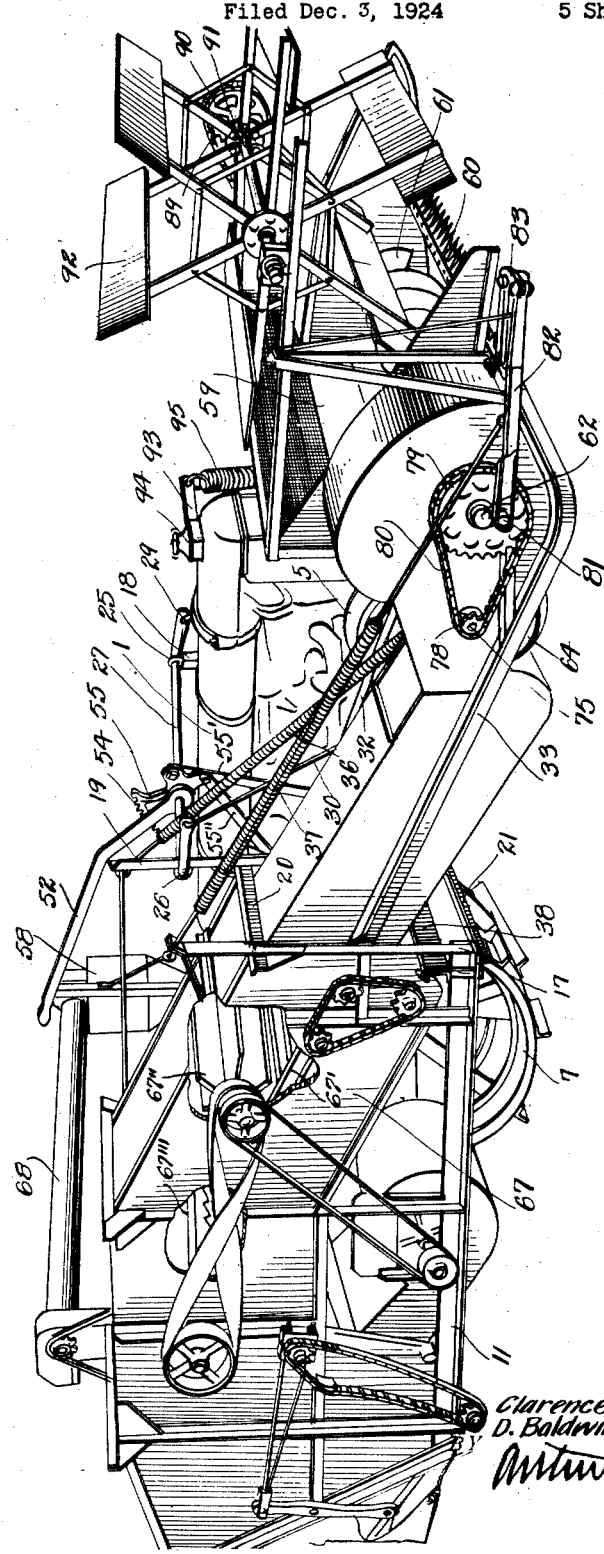

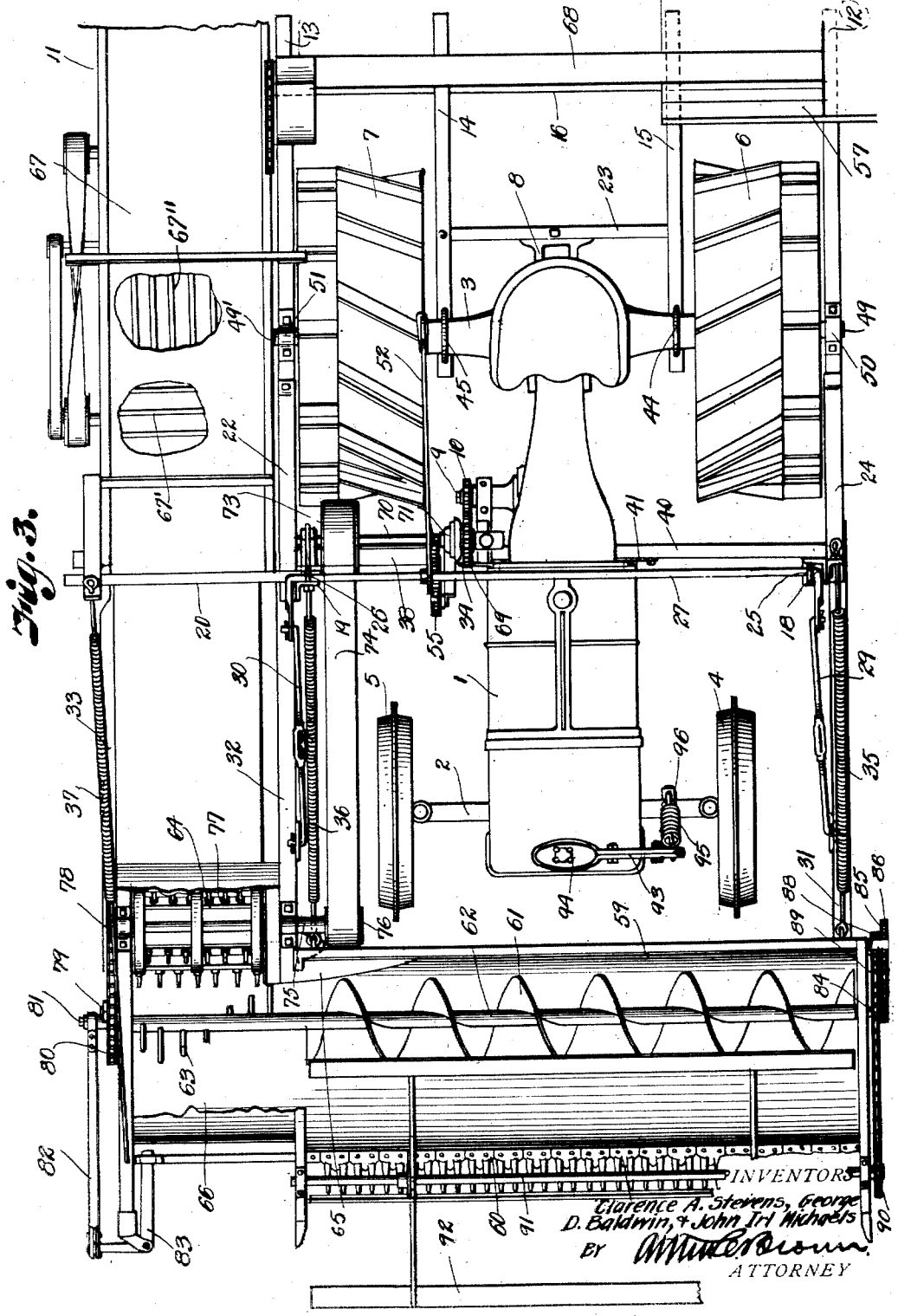

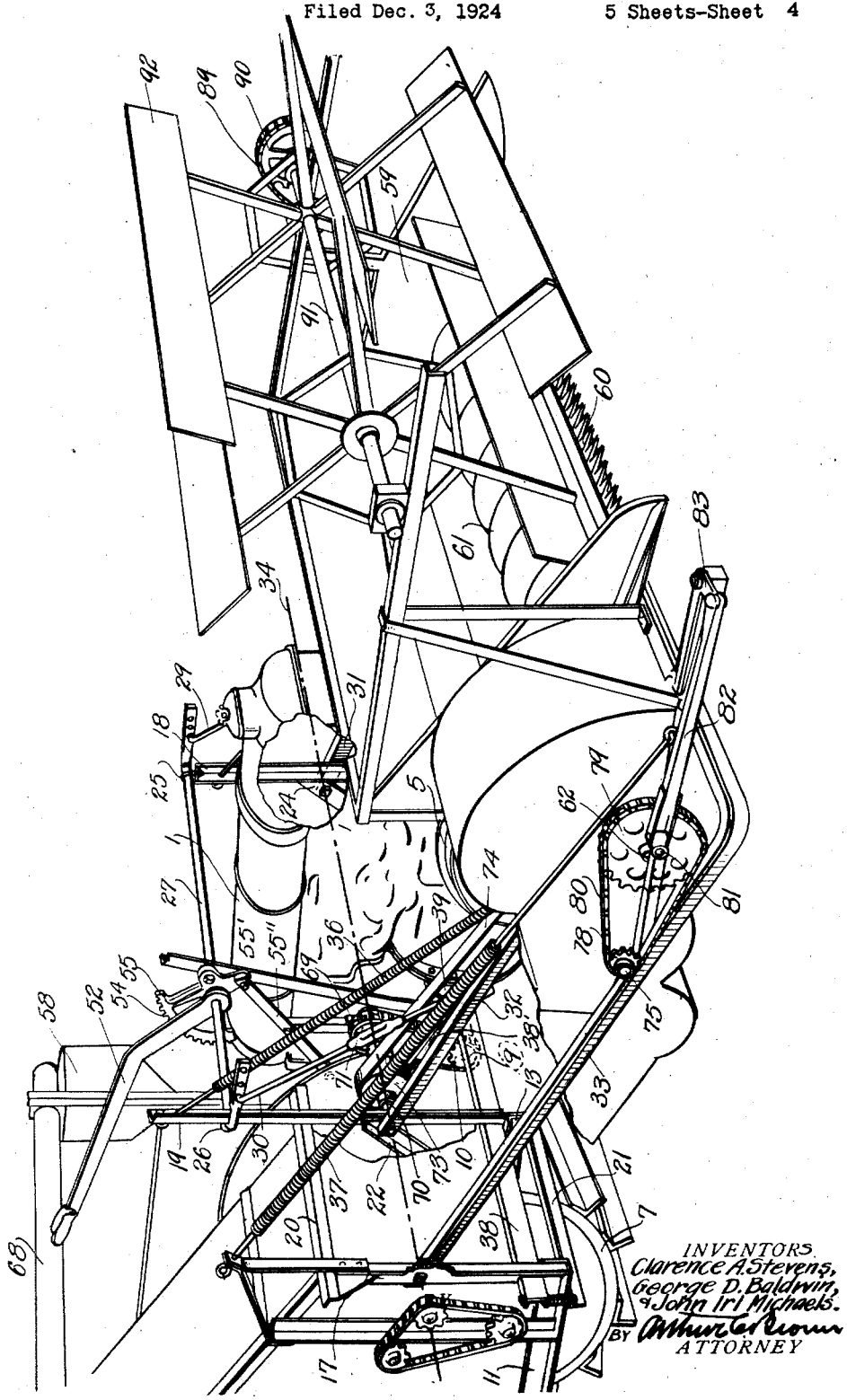

1,702,323

UNITED STATES PATENT OFFICE.

CLARENCE A. STEVENS, GEORGE D. BALDWIN, AND JOHN IRL MICHAELS, OF WICHITA, KANSAS, ASSIGNORS, BY MESNE ASSIGNMENTS, TO THE GLEANER COMBINE HARVESTER CORPORATION, OF INDEPENDENCE, MISSOURI, A CORPORATION OF DELAWARE.

COMBINED HARVESTER, THRASHER, AND SEPARATOR.

Application filed December 3, 1924. Serial No. 753,688.

This invention relates to a combined harvester, thrasher and separator and particularly to a harvesting, thrashing and separating mechanism which is adapted to be mounted upon or attached to the frame of a conventional type of tractor without materially altering the tractor. In other words, the invention contemplates as an important feature the provision of a harvester, thrasher and separator unit which may be built complete, ready to be attached to a previously constructed tractor as distinct from a combined harvester, thrasher and separator which is built into the frame of the tractor as part of a unitary structure and our invention particularly contemplates the provision of means for attaching the combined harvester, thrasher and separator to a tractor.

There are certain details of construction in the harvester, thrasher and separator attachment which we consider of considerable importance aside from the fact that the harvester (and by this we include the thrasher and separator) attachment may be applied to and detached from the tractor in an expeditious and convenient manner without altering the tractor so the tractor can be used for purposes other than harvesting.

Another advantage is that the harvester unit is so constructed that the thrasher element can be placed close to the conveyor. Another advantage is that the sickle, the feeder and the cylinder are arranged as one unit, thereby enabling us to shorten the whole machine and allow us to arrange this unit close to the conveyor in a convenient way.

It is by no means an unimportant feature of the invention that the harvester unit or attachment for the tractor is so constructed that it will be relatively light and compact in form, that it may be readily adjusted for varying heights of grains and that it may have sufficient flexibility to operate over uneven surfaces such as are ordinarily encountered during a harvesting operation. The machine is so constructed that it has ample capacity for handling varying quantities of material such as are encountered by field thrashers and positive means is provided for moving the material in its proper classes from the time it is taken into the machine until the grain is delivered into its receptacles and the refuse discharged from the machine.

In order to properly comprehend the novel details of construction by which the various objects and results are accomplished, reference should be had to the following description in connection with the accompanying drawings, in which Fig. 1 is a perspective view of a harvester, thrasher, and separator attachment applied to a tractor.

Fig. 2 is a similar view from the side opposite to Fig. 1.

Fig. 3 is a plan view of the tractor and attachment combined.

Fig. 4 is a left hand, front, perspective view of the device, parts being broken away to illustrate its pivotal mounting and adjustable suspension of the working parts of the harvester unit.

Fig. 5 is a detailed perspective view of the skeleton frame for supporting the working mechanisms of the unit.

Fig. 6 is a perspective view of the means for connecting the frame to the middle portion of the tractor, and Fig. 7 is a view partly in elevation and partly in section showing an attachment for the rear wheels of the tractor on which the frame may be hung.

The tractor illustrated comprises the main body portion 1, (Fig. 3) the front axles 2, the rear axle housing 3, the front wheels 4 and 5, rear wheels 6 and 7 and a draw bar 8. All of these constitute a conventional construction found in any tractor. The drive shaft 9 however, ordinarily carries a pulley but in the present instance, we have substituted a sprocket 10 from which power may be delivered through geared transmission to the operating parts of the attachment.

The various elements of the attachment are supported upon a skeleton frame, best shown in detail in Fig. 5. The skeleton frame is illustrated as comprising two side bars 11 and 12 preferably in the form of channels, a third longitudinal bar 13 to one side of the longitudinal center of the frame and two parallel relatively short longitudinal bars 14 and 15. The rear ends of the bars 11 to 15, both inclusive are connected by a rear transverse bar 16. All of the bars thus described are preferably channel bars, although we do not wish to be limited to any particular commercial shape. The bars 11, 12, and 13 are longer than the bars 14 and 15 but they do not extend beyond approximately the middle portion of the tractor and at approximately that point there are two vertical posts 17 and 18 fast to the side bars 11 and 12 and a vertical post 19 fast to the bar 13. The posts 17 and 19 are connected by an angle 20 and the front ends of the bars 11 and 13 are connected by a transverse brace bar 21. The post 19 is further braced with respect to the bar 13 by an inclined brace 22, and the bars 14 and 15 are connected by a transverse bar 23 to which the draw bar 8 may be fastened in a convenient manner. The post 18 is connected to the bar 12 by an inclined brace 24 corresponding to the brace 22 and secured in bearings 25 and 26 on posts 18 and 19 is a rocking crank shaft 27 connected by links 29 and 30 to the suspension arms 31 and 32 with which the complementary arm 33 forms a sub-frame that serves to support the working parts of the attachment, as will presently be described, the arms 31, 32 and 33 being pivoted to the posts 17, 18 and 19 on the axial line 34 (Figs. 4 and 5). This sub-frame and its load are balanced or normally held in an upward position by the tension springs 35, 36 and 37 fastened to the posts 18, 19 and 17 and to convenient parts of the sub-frame so that the latter will be yieldingly held supported by the posts. The front end of the sub-frame may be adjusted vertically through the medium of a lever mechanism controlling the rocking crank shaft 27. The bars 11 and 13 support a transverse arm 38 carrying a plate 39 and the bar 12 supports a similar arm 40 carrying a plate 41, the arms 38 and 40 being braced with respect to the posts 19 and 18 by bars 38' and 42, and the plates 39 and 41 being attached to the tractor by bolts or other suitable means (not shown) to securely connect the frame with the tractor. The attachment frame is supported from or connected to the tractor by U-bolts 44 and 45 which are carried by the frame bars 14 and 15 and enclose the axle housing 3 and by extensions 49 and 49' on the rear axles. The wheels 6 are provided with bushings 46, having flanges 46' attached to the wheels by bolts 47. Fixed to the axle extensions are sleeves 48 having flanges 48' arranged back to back with the wheel bushing flanges 46' and secured thereto by the same bolts 47 that attach the bushings 46 to their wheels. In this way the extensions are securely connected with the tractor wheels and when the frame is applied to the tractor the extensions journal in the bearings 50 and 51 on the frame members 12 and 13 and support the frame from the axle of the tractor.

The sub-frame comprising the side bars 31, 32 and 33 may be adjusted vertically by a hand lever 52, fixed to the rock shaft 27 and provided with a pawl 53 (Fig. 5) engageable with the teeth 54 of a segment 55, which is pivotally mounted on the rock shaft, but held from turning therewith by bars 55' and 55'', each of which bars is fixed to the segment at one end and to the attachment frame at the other end. The pawl is spring-actuated to normally engage the segment, but retractable by a rod 53' carried by the hand lever in the usual way. The rear part of the frame carries a seat 56 on a platform 57 immediately below the delivery hopper 58 to be hereinafter referred to.

Mounted on the forward part of the sub-frame composed of the arms 31, 32 and 33 is a transverse conveyor casing 59 which also supports the sickle bars 60, the sickle bars operating in the usual way. Within the casing 59 and immediately in rear of the sickle bars 60 is a worm conveyor 61, which is mounted on a shaft 62. The conveyor terminates short of the shaft and on the free end thereof are pins or fingers 63 immediately in front of the cylinder 77 and concave 64 so that the cut grain will be fed into the cylinder and concave. and in order that liability of the grain clogging or binding up at the end of the conveyor 61 be eliminated, we have provided an outwardly directing baffle or guide 65 in the casing 59 (Fig. 3) to deliver the grain into the chamber 66 in front of the cylinder and concave.

The casing 59, with the cutter bar, the conveyor, the cylinder and the concave, constitute a unit adjustable with respect to the casing 67. The casing 67 is fixed relative to this adjustable unit and contains a conveyor 67', beaters 67'' and separator 67''' of types common to thrashing mechanism and for that reason are not illustrated in detail in the drawings, but may be of constructions adapted for treating grain delivered to the casing 67 from the casing 57. At its rear end the casing 67 delivers the separated grain into a conveyor pipe 68, which carries the grain to a hopper 58 from which the grain may be sacked by an operator riding on the platform 57.

The power from motor shaft 9 is delivered through sprocket 10 to sprocket 69 on shaft 70, there being a clutch 71 between the gear 69 and the shaft 70. It is obvious, of course, that the tractor can move over the field without setting the harvester mechanism in operation if the clutch 71 is out, but that the operating mechanism will perform if the clutch is in. The shaft 70 carries a pulley 73 which drives a belt 74 communicating motion to the shaft 75 through the medium of the pulley 76. The shaft 75 drives the cylinder 77 and on one end of the cylinder shaft is a sprocket 78 which drives a sprocket 79 on conveyor shaft 62 through the medium of a chain 80.

The sprocket 79 has a wrist pin 81 which drives a pitman 82 communicating motion to an elbow lever 83 to operate the movable cutter bar in the usual manner. The other end of the shaft 62 carries a sprocket 84 which through the chain 85 drives a sprocket 86 on shaft 87. The shaft 87 carries a sprocket 88 which through a chain 89 drives sprocket 90. The sprocket 90 is mounted on the reel shaft 91 carried by the frame so that the reel 92 can be rotated to gather in the grain, the reel being carried as part of the unit supported by the casing 59 and the swinging bars 31, 32 and 33. This permits the entire front operating mechanism to be raised or lowered at a single operation.

We have not described in detail the various belting arrangements for operating the beaters and the conveyors in rear of the front unitary structure because such mechanism is well known and in so far as this present application is concerned, it is immaterial what construction of separating blower, conveyor or beater is used, it being important however, that such elements should be arranged in a compact form and conveniently supported by the frame structure contemplated by the generic ideas illustrated specifically in Fig. 5. Since the conveyors, beaters, separators, etc., are carried at one side of the longitudinal center of the machine, we have provided a compensating device consisting of an arm 93 supported by the radiator filler 94 and having a compensating spring 95 thereon which may be attached to the front axle 2 at 96 so as to tend to compensate for the weight on one side of the longitudinal center of the machine.

Attention is called to the fact that the bars 31, 32 and 33 are pivoted to the rear portion of the main frame with their pivots in axial alignment with the power shaft 70 so that if the frame carrying the conveyor casing 59, the cutter bars, the conveyor, the cylinder and concave and the tubular member 67 for the conveyor is swung about its pivot, the belt 74 will swing about the axis of the pulley 73 which is on 70, consequently there will be no tendency of the belt to become slack or tight during the swinging movement.

From the foregoing it will be apparent that the invention comprehends a simple form of harvester, thrashing and separating attachment carried by a light but durable skeleton frame construction which may be conveniently attached to and detached from a known type of tractor so that the tractor and harvesting attachment may be quickly functionally associated when it is desired to harvest and the tractor may be conveniently and expeditiously disassociated from the attachment when it is desired to use the tractor for other purposes. This is an important feature for the reason that if the tractor constitutes a permanent part of the harvesting, thrashing and separating unit it would be unavailable for other purposes such as plowing, cultivating, trucking, etc. With the harvesting mechanism constituting an attachment for the tractor, however, the tractor is available for other purposes. Attention is particularly called to the fact that by providing the relatively wide frame, compactly built to be easily attached to the tractor and by bracing a relatively broad harvester front to the frame, a wide swath can be cut so that the machine has a considerable capacity, the reel folding in the heads of the grain to present the grain to the cutter bars, the screw conveyor passing the cut grain along to the cylinder and concave or thrasher in a steady stream without liability of clogging, the fingers 63 pressing the grain lengthwise of the machine into the cylinder and concave where it is thrashed and the thrashed grain passed through the pipe 68 to the sacking hopper, thereby performing the complete harvesting operation with the single machine.

What we claim and desire to secure by Letters Patent is:

1. A combined harvester, thrasher and separator including a main frame and means for attaching the same to a tractor, a sub-frame adjustably supported from the main frame, harvesting mechanism carried by the sub-frame and comprising a transverse conveyor, thrashing mechanism on the sub-frame at one side of its longitudinal center, arranged to receive material from the adjacent end of the conveyor, a separator on the main frame, and a conveyor on the main frame for receiving material from the thrashing mechanism and conducting it to the separator.

2. In combination with a tractor, a main frame removably fixed on the tractor, a sub-frame adjustably mounted on the main frame forwardly of the tractor and in its line of draft, cutting mechanism arranged transversely on the sub-frame, a primary conveyor on the sub-frame in direct receiving relation to the cutting mechanism, thrashing mechanism on the sub-frame in direct receiving relation to the primary conveyor, a secondary conveyor on the main frame in receiving relation to the thrashing mechanism, and a separator on the main frame in receiving relation to the secondary conveyor.

3. A combined harvester, thrasher and separator including a frame, means for removably securing the frame to a tractor, arms pivoted to the frame, a cutting mechanism, a screw conveyor in rear of the cutting mechanism having a shaft with an end projecting beyond the screw part of the conveyor, fingers on the projecting part of the shaft, a baffle at the delivery end of the conveyor, and a thrashing mechanism in rear of the fingers, all supported by the arms, a separator supported by the frame and means for conducting material from the thrashing mechanism to the separator.

4. A combined harvester, thrasher and separator including a tilting frame, a cutting mechanism, a screw conveyor in rear of the cutting mechanism, a baffle adjacent the delivery end of the screw conveyor, fingers at said end of and rotatable with the screw conveyor, and a thrashing mechanism in line with the fingers, all carried by the tilting frame, a shaft having an axis in line with the axis of the tilting frame, means receiving power from said shaft for driving the operating members on the tilting frame, and a separator adapted for receiving material from the thrashing mechanism.

5. A combined harvester, thrasher and separator including a frame having anchor arms, plates on the arms for attachment to a tractor, a bar on the frame for attachment to the draw bar of the tractor, a plurality of vertical posts carried by the frame, a rock shaft carried by the posts, pivoted arms carried by the posts, connections between the rock shaft and the pivoted arms whereby the arms may be tilted in one direction, springs connected to the arms at one end, means for anchoring the opposite ends of the springs, and cutting, conveying and thrashing mechanism carried by the arms.

6. A combined harvester, thrasher and separator including a main frame, a sub-frame adjustably mounted on the main frame, cutting mechanism carried by and extending transversely at the front of the sub-frame, a conveyor carried by and extending transversely of the sub-frame rearwardly of and in direct receiving relation to the cutting mechanism, thrashing mechanism on the sub-frame adapted for receiving material from the conveyor, a separator on the main frame, and means for conducting material from the thrashing mechanism to the separator.

7. A combined harvester, thrasher and separator including a main frame, a sub-frame adjustably mounted on the main frame, cutting mechanism carried by and extending transversely at the front of the sub-frame, a conveyor casing at the rear of and in direct receiving relation to the cutting mechanism, a thrashing chamber at one end of the conveyor casing, a worm conveyor in said casing for delivering grain through the casing, means for impelling grain from the conveyor casing into the thrashing chamber, thrashing mechanism in said chamber, and means supported by the main frame for receiving material from the thrashing mechanism and separating said material.

8. A combined harvester, thrasher and separator including a main frame, a sub-frame pivotally mounted on the main frame, a conveyor casing on the sub-frame, a feeding chamber at one end of and communicating with the conveyor casing a thrashing chamber on the sub-frame communicating with the feeding chamber, a screw conveyor in said casing for impelling grain to the feeding chamber, means in the feeding chamber for impelling grain to the thrashing chamber, thrashing mechanism in the thrashing chamber, a separator on the main frame, and means for delivering material from the thrashing chamber to the separator.

9. A combined harvester, thrasher and separator including a main frame, a sub-frame pivotally mounted on the main frame, a conveyor casing on the sub-frame, a feeding chamber at one end of and communicating with the conveyor casing, a thrashing chamber on the sub-frame communicating with the feeding chamber, a screw conveyor in said casing for impelling grain to the feeding chamber including a conveyor element and a shaft element extending beyond the conveyor element within the feeding chamber, means on said shaft element for delivering grain from the feeding chamber into the thrashing chamber, thrashing mechanism in the thrashing chamber, a separator on the main frame, and means for delivering material from the thrashing chamber to the separator.

10. A combined harvester, thrasher and separator including a main frame, a sub-frame pivotally mounted on the main frame, means on the main frame for raising and lowering the sub-frame, a conveyor casing on the sub-frame, a feeding chamber at one end of and communicating with the conveyor casing, a thrashing chamber on the sub-frame rearwardly of and communicating with the feeding chamber, a screw conveyor in said casing for impelling grain to the feeding chamber, means in the feeding chamber for impelling grain to the thrashing chamber a separator on the main frame, and means for delivering material from the thrashing chamber to the separator.

11. A combined harvester, thrasher and separator including cutting mechanism, a conveyor casing at the rear of and in direct receiving relation to the cutting mechanism, a feeding chamber at one end of the conveyor casing, a screw conveyor in said casing for impelling grain through the casing into the feeding chamber, a thrashing chamber in direct communication with the feeding chamber, means for impelling grain from the feeding chamber into the thrashing chamber, thrashing mechanism in the thrashing chamber, a separator, and means for conducting material from the thrashing chamber to the separator.

12. A combined harvester, thrasher and separator including a frame, cutting mechanism extending transversely of the machine at the front end of the frame, a conveyor on the frame extending transversely thereof positioned rearwardly of the cutting mechanism and in direct receiving relation therewith, a feeding chamber at one end of the conveyor, a thrasher adjacent said feeding chamber and receiving grain directly therefrom, and means on the conveyor for impelling grain from the conveyor to the thrasher.

In testimony whereof we affix our signatures.

CLARENCE A. STEVENS.
GEORGE D. BALDWIN.
JOHN IRL MICHAELS.